M. N. De VEARA.
SEED-PLANTER.
No. 191,845. Patented June 12, 1877.
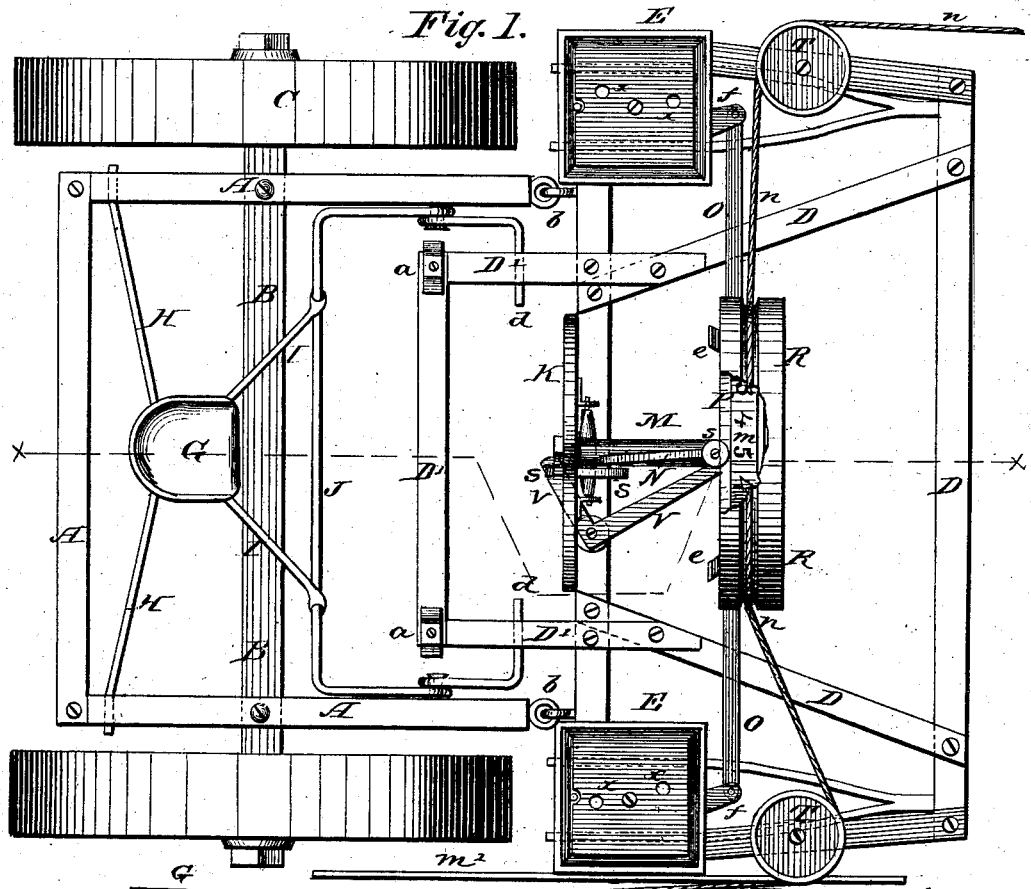
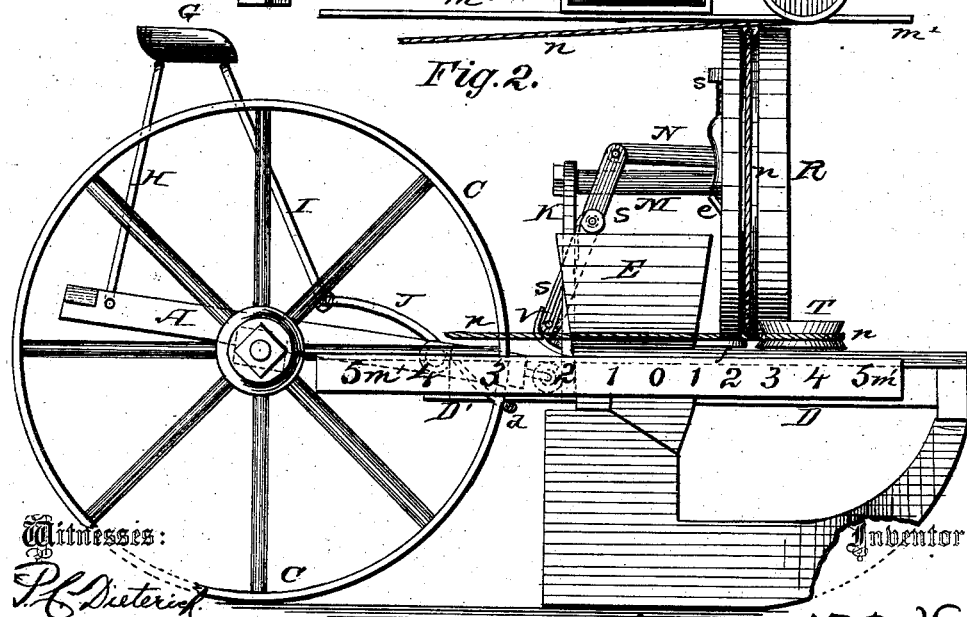
Witnesses:
Inventor
Manuel N. De Veara
Per West & Bond Attorneys.

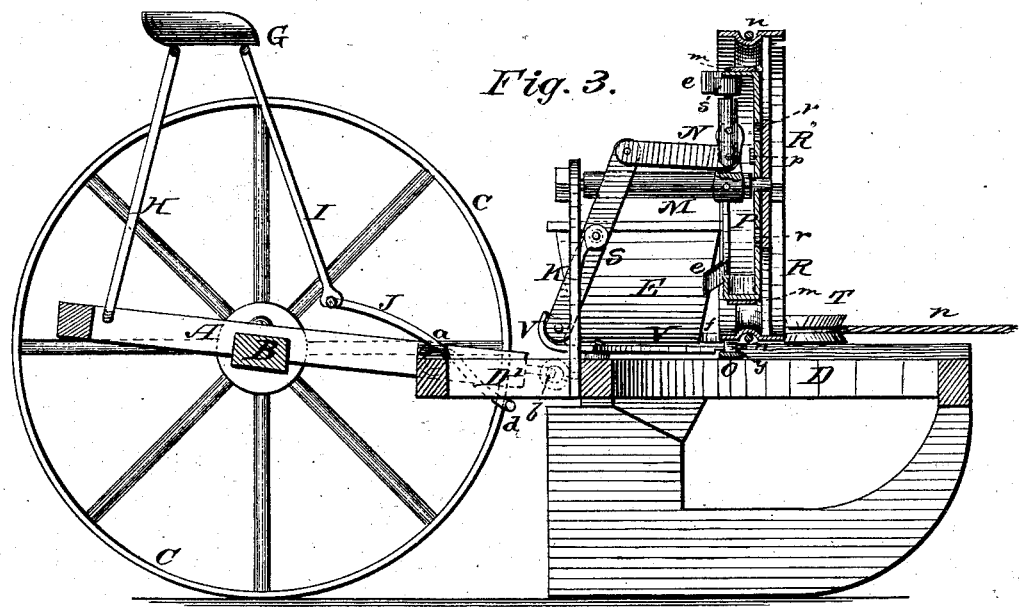

UNITED STATES PATENT OFFICE.

MANUEL N. DE VEARA, OF SPRINGFIELD, ILLINOIS.

IMPROVEMENT IN SEED-PLANTERS.

Specification forming part of Letters Patent No. 191,845, dated June 12, 1877; application filed April 19, 1877.

*To all whom it may concern:*

Be it known that I, MANUEL N. DE VEARA, of Springfield, in the county of Sangamon and State of Illinois, have invented certain new and useful Improvements in Seed-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a seed-planter, as will be hereinafter more fully set forth.

In the annexed drawings, Figure 1 is a plan view, and Fig. 2 a side elevation, of my seed-planter. Fig. 3 is a vertical section of the same through the line $x\ x$, Fig. 1. Fig. 4 is a rear view of the front carriage. Figs. 5 and 6 are detailed views of the seed-box, showing the seed-dropping mechanism.

A represents the rear frame of the machine, supported upon the axle B, having a wheel, C, on each end. D is the front frame, carrying the seed-boxes E E, and having the usual furrow-openers and conductors attached to it. D' D' are the hounds of the front frame, on the rear ends of which are fastened stirrups or foot-rests $a\ a$, for the feet of the driver to rest on. The two frames A and D are connected by hooks $b\ b$, or other equivalent means. G is the driver's seat, supported at the rear by two flexible or yielding braces, H H, fastened to the rear portion of the frame A; and the front of the seat is supported by two arms, I I, attached to a rod, J, which has its ends bent forward and pivoted to the side beams of the frame A. The extreme forward ends of the rod J are bent inward, forming arms $d\ d$, which pass under the hounds D' D' of the frame D, as shown.

By the driver throwing his body forward or backward in the seat the front carriage may be raised or lowered, as required, and thus making the planter as light as desired on the yoke of the horses.

In the bottom of each seed-box or hopper E are two dropping-holes, $x\ x$, and on said bottom rest two oscillating slides, L L, which are made in segmental form, and pivoted one in the front and the other in the rear of the box. The inner curved edges of these segmental slides are cogged and geared together by means of a centrally-pivoted pinion, $h$. Over this gearing is another bottom, provided with dropping-holes corresponding with the holes $x$. In each slide L is a dropping-hole, $i$, as shown. By the action of this double gearing an oscillating motion is obtained, so that when one side is filling the opposite one is dropping.

The front slide L in each seed-box is provided with a forwardly-projecting arm, $f$, and these two arms are connected by a bar, O, having the arms pivoted to its ends.

On the front carriage D is a suitable frame, K, from which projects a horizontal arm, M, and on the forward end of this arm are mounted two wheels, P and R, one within the other. The inner or smaller wheel P is formed with suitable cams $e$, and has a scale, $m$, on its periphery. The outer or larger wheel R has a circumferential groove in which the line or rope $n$ runs, said line passing around pulleys T T at the sides of the front carriage D, and its ends staked at the ends of the field. The two wheels P and R are connected by means of bolts $p$, passing through slots $r$ in the wheel P, as shown, allowing the two wheels to be set according to a scale, $m'$, on the side of the planter, by which means the planter may be set so as to drop in accordance with the hills in the preceding rows.

On the arm M is pivoted an L-shaped lever, N, one arm of which has a friction-roller, $s$, that bears against the cams $e$ on the wheel P, and the other arm is, by a straight pivoted lever, S, connected with one arm of another pivoted elbow-lever, V. The other arm of this latter elbow-lever enters a staple, $y$, on the connecting-bar O, so that by the continuous rotary motion of the wheels R P a reciprocating motion is imparted to the bar O, thereby oscillating the dropping-slides L L.

Having thus fully described my invention, what I claim as new, and desire to secure by Letters Patent, is—

1. In a two-frame seed-planter, the combination of the lever-rod J with the pivoted or flexibly-supported seat, G, having its front support on the lever-rod for raising or lowering the front frame, substantially as herein set forth.

2. In a seed-planter, the combination of the rear frame A, the front carriage D, flexibly connected thereto, and having hounds D', with foot-rests $a$, the seat G, with flexible supports H and rigid supports I, and the bent pivoted cross-bars J, having its ends forming the arms $d\ d$, substantially as and for the purposes herein set forth.

3. The oscillating cogged segmental dropping-slides L L, connected or geared together by the centrally-pivoted pinion $h$, as and for the purposes set forth.

4. The combination of the geared oscillating slides L L, arms $f\!f$, connecting-bar O, levers V, S, and N, and the cam-wheel P, all constructed and arranged to operate substantially as and for the purposes herein set forth.

In testimony that I claim the foregoing as my own I affix my signature in presence of two witnesses.

MANUEL N. DE VEARA.

Witnesses:
JOSEPH DE VEARA,
DOWN JOHNSTON.